(12) United States Patent
Bendel

(10) Patent No.: US 10,882,222 B2
(45) Date of Patent: Jan. 5, 2021

(54) ESCAPE PATH FOR A PRODUCTION MOLD OF A ROTOR BLADE

(71) Applicant: Senvion GmbH, Hamburg (DE)

(72) Inventor: Urs Bendel, Fockbek (DE)

(73) Assignee: Senvion GmbH, Hamburg (DE)

( * ) Notice: Subject to any disclaimer, the term of this patent is extended or adjusted under 35 U.S.C. 154(b) by 658 days.

(21) Appl. No.: 15/624,828

(22) Filed: Jun. 16, 2017

(65) Prior Publication Data

US 2017/0361507 A1 Dec. 21, 2017

(30) Foreign Application Priority Data

Jun. 16, 2016 (DE) .................. 10 2016 007 304

(51) Int. Cl.
| | | |
|---|---|---|
| B29C 37/00 | (2006.01) | |
| B29C 33/26 | (2006.01) | |
| B29D 99/00 | (2010.01) | |
| B29C 33/30 | (2006.01) | |
| B29C 33/00 | (2006.01) | |
| B29C 70/34 | (2006.01) | |
| B29L 31/08 | (2006.01) | |

(52) U.S. Cl.
CPC .............. B29C 37/00 (2013.01); B29C 33/00 (2013.01); B29C 33/26 (2013.01); B29C 33/307 (2013.01); B29C 70/345 (2013.01); B29D 99/0028 (2013.01); *B29C 2037/94* (2013.01); *B29L 2031/085* (2013.01); *Y02E 10/72* (2013.01); *Y02P 70/50* (2015.11)

(58) Field of Classification Search
CPC .......... B29C 37/00; B29C 33/00; B29C 33/26
See application file for complete search history.

(56) References Cited

U.S. PATENT DOCUMENTS

| | | | | |
|---|---|---|---|---|
| 2006/0034971 A1* | 2/2006 | Olsen | ...................... | F03D 1/065 |
| | | | | 425/451.5 |
| 2012/0061024 A1* | 3/2012 | Starke | ................... | B29C 33/306 |
| | | | | 156/475 |
| 2012/0210665 A1* | 8/2012 | Park | ........................ | E04B 1/942 |
| | | | | 52/506.05 |

FOREIGN PATENT DOCUMENTS

DE 10 2010 049 502 A 5/2012

OTHER PUBLICATIONS

Ausschuss für Arbeitsstätten: Fluchtwege und Notausgänge, Flucht- und Rettungsplan. ASR A2.3, Aug. 2007, 11., www.baua.de [online].
Bundesministerium der Justiz und für Verbraucherschutz: Verordnung über Arbeitsstätten (Arbeitsstättenverordnung—ArbStättV). Dec. 8, 2004, www.juris.de [online].

(Continued)

*Primary Examiner* — Jacob T Minskey
*Assistant Examiner* — Melody Tsui
(74) *Attorney, Agent, or Firm* — Bay State IP, LLC

(57) ABSTRACT

The invention relates to a production mold for a rotor blade of a wind turbine plant, having two mold half-shells (3, 4) which during a production method of the rotor blade are disposed so as to be at least temporarily beside one another, and having at least one inner walkway (2c, 2d) that runs along so as to be between the two mold half-shells (3, 4), characterized by at least one escape path (40) which runs along below at least one of the two mold half-shells (3, 4).

14 Claims, 3 Drawing Sheets

(56) References Cited

OTHER PUBLICATIONS

Covestro AG: Effiziente Herstellung von Windkraftanlagen. 45 Meter langer Holmgurt aus Polyurethan, Oct. 12, 2005, https://www.kunststoffe.de/produkte/uebersicht/beitrag/effizientere-herstellung-vonwindkraftanlagen-45-meter-langer-holmgurt-aus-polyurethan-1273740.html [online].
Norm DIN ISO 23601 ICS 01.080.10; 13.200. Sicherheitskennzeichnung—Flucht und Rettungspläne (ISO 23601:2009). [Beuth Standards Collection—Stand 2016-11].
Wikipedia: Fluchtweg. May 12, 2016, https://de.wikipedia.org/wiki/Fluchtweg [online].

* cited by examiner

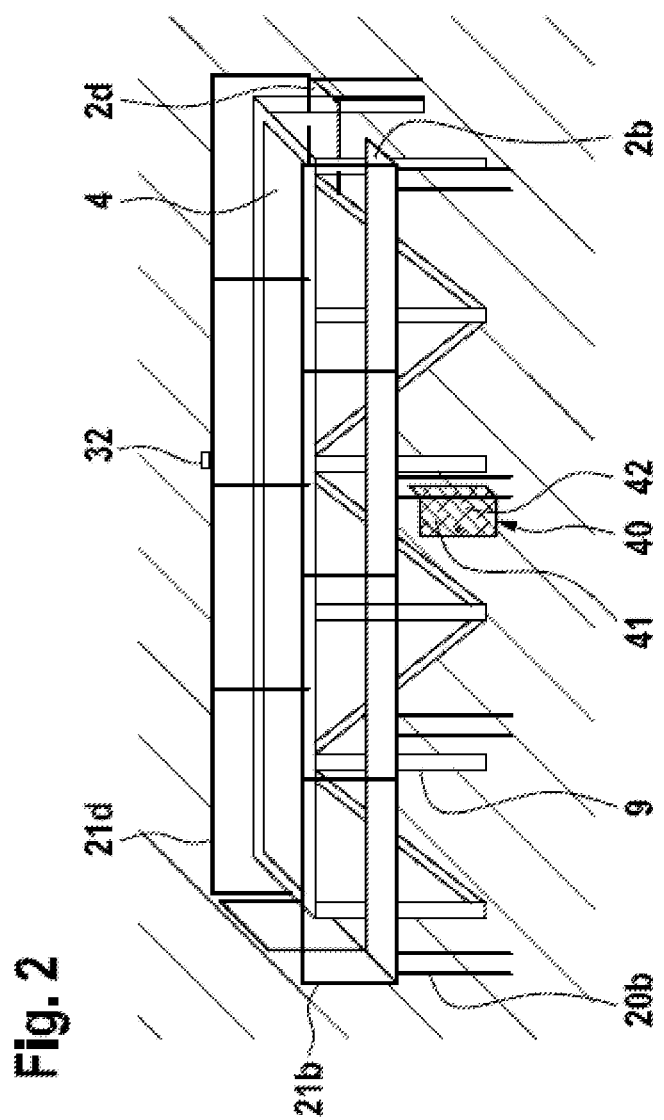

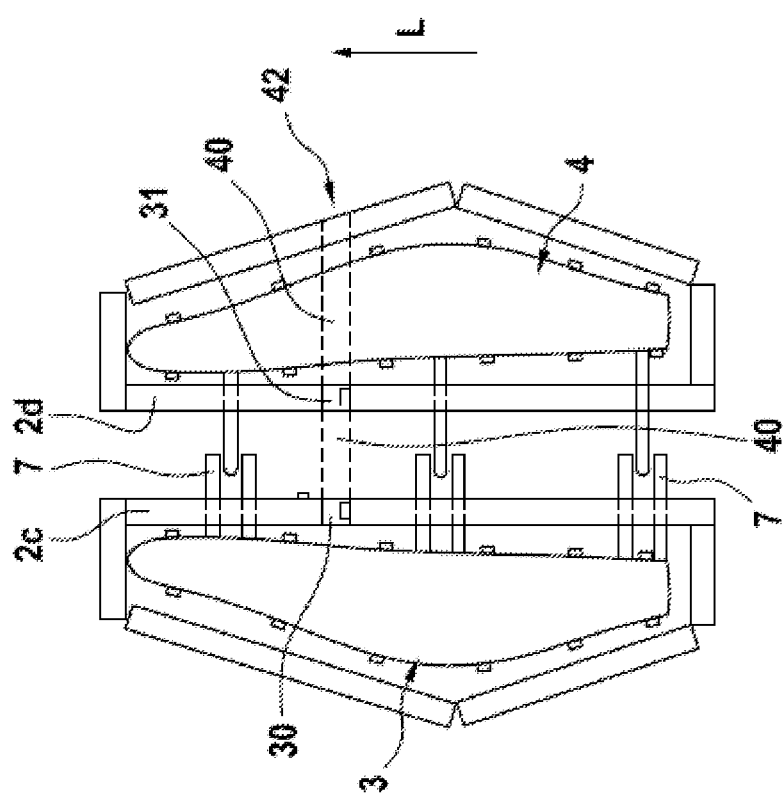

ESCAPE PATH FOR A PRODUCTION MOLD OF A ROTOR BLADE

CROSS REFERENCE TO RELATED APPLICATION

This application claims the benefit of and takes priority from German Patent Application 10 2016 007 304.7 filed on Jun. 16, 2016, the contents of which are herein incorporated by reference.

BACKGROUND OF THE INVENTION

Field of the Invention

The invention related to a production mold according to the preamble of claim 1.

Description of the Related Art

Rotor blades are usually assembled from separately made components such as rotor blade half-shells, belts, and webs. The separate components are made in production molds that are individually specified therefor. First, a plurality of layers, for example fiber-containing woven fabric tiers, foams, balsa, etc. are first laid up on top and/or beside one another in the production mold. The layers such disposed form a preferably dry semi-finished product, but other production methods can also be used in the production mold according to the invention. The mold shells per se can likewise be composed of a fiber-composite material. In order for space to be saved in the manufacturing installation, the mold shells are set up in as cramped a manner as possible, the longitudinal sides being aligned beside one another. The mold shells have an open surface that is aligned in a substantially upward manner, the material for the construction of the rotor blade component being applied on said surface. The rotor blade components can be, for example: webs, belts, blade half-shells or segments thereof, and other components.

The configuration of the production molds according to the invention will be explained hereunder using the example of the molds for the rotor blade half-shells. However, the production mold according to the invention is not limited to said example, but applies generally to all production molds.

The two mold half-shells for the rotor blade half-shells in the cross section are configured so as to be semi-circular, semi-elliptic, or similar, wherein the configuration of the cross section depends very much on the position of the section in the longitudinal direction of the rotor blade half-shell. In any case, the mold half-shell is closed toward the bottom and thus toward the ground, and open toward the top and thus facing away from the ground. The mold half-shell is laid up with the woven fabric tiers and also serviced in other ways from the open side.

The two mold half-shells lie beside one another in a factory shed, and the two rotor blade half-shells can in each case be made in one piece. Modern rotor blades herein can readily have lengths between 40 and 60 or 75 meters or even more. It is generally of particular importance for the two rotor blade half-shells after the separate manufacturing thereof to be positioned in a positionally accurate manner on top of one another by way of a folding mechanism, and for peripheries of the two rotor blade half-shells to be adhesively bonded to one another. To this end, the mold half-shells are in each case assembled on a substructure, for example a steel framework, wherein the two steel framework substructures are connected to one another by way of a pivot mechanism which is favorably configured so as to be electric, hydraulic, or pneumatic, enabling slow pivoting of the foldable mold half-shell in a very positionally accurate manner onto the positionally fixed mold half-shell. Before the two rotor half-shells come into contact, a periphery of the rotor blade half-shell, preferably the periphery of the positionally fixed rotor blade half-shell, is brushed with an adhesive, and the foldable rotor blade half-shell by way of the periphery thereof is only then pressed onto the positionally fixed rotor blade half-shell.

The rotor blades at the stem-side end can have diameters of two to six meters or even more; moreover, the rotor blades in one particularly advantageous embodiment are pre-bent in the direction of the side of aerodynamic pressure, the latter representing substantially that side of the rotor blade that in productive operation faces away from the tower, so as to enlarge the geometric spacing of the unstressed blade from the tower wall.

This leads to the two mold half-shells in the unfolded state by way of the ground-side ends thereof having very dissimilar heights above the ground along a longitudinal direction. The central region of the positionally fixed mold half-shell that absorbs the suction-side rotor blade half-shell is spaced apart from the ground by only up to approximately one meter, while the point of the foldable mold half-shell that is located in the same section is disposed three to four meters above the ground. The term ground herein is also understood to be a shed ground, or similar. In order for the mold half-shells for the manufacturing of the rotor blade half-shells to also be able to be serviced from the inside, walkway frames on which walkways are installed are provided along the longitudinal sides as well as along the tip side and along the stem side. The walkways can be composed of scaffolding boards or steel grates. Since the two mold half-shells by way of the inner longitudinal sides thereof are positioned beside one another in the longitudinal direction, and at least one inside walkway, possibly even two walkways, is/are provided between the two inside rotor blade half-shells, a life-threatening situation can arise in an emergency, such as in the case of fire, for example, for operators who are on the inside walkway, approximately in the center thereof in the longitudinal direction.

SUMMARY OF THE INVENTION

It is therefore the object of the present invention to provide a production mold that is improved, in particular safer, in comparison to the prior art.

The object is achieved by a production mold mentioned at the outset, having the features of claim 1.

The production mold according to the invention for the production of a rotor blade of a wind turbine plant comprises two mold half-shells, preferably in each case having one open side. The two mold half-shells during the duration of the production method of the rotor blade are disposed so as to be at least temporarily beside one another. An inner walkway runs between the two mold half-shells that are beside one another. The two mold half-shells are serviced from the inner walkway by personnel. According to the invention, an escape path which, proceeding from the inner walkway, runs below one of the two or both mold half-shells, preferably leading out of a region of the production mold, is provided for the personnel working on the inner walkway. The escape path is configured so as to be comparatively short on account of the arrangement running below one of the two mold half-shells.

The two mold half-shells are in each case favorably disposed in a mounting installation which is configured in the form of a substructure. The two mounting installations are connected to one another in an articulated manner, wherein the articulated connection is configured so as to be in particular electric, hydraulic, or pneumatic, and so as to be able to be controlled in a centralized manner by way of one control center.

The two mounting installations are foldable in a reciprocating manner between an opened position in which the two mold half-shells, the open sides thereof facing upward, are disposed beside one another, and a closed position in which the two mold half-shells, the open sides thereof facing one another, are disposed on top of one another. The two mold half-shells herein are preferably folded by way of the inner longitudinal sides thereof which run along the aerodynamic leading edge of the rotor blade.

In the opened state at least one inner walkway is disposed between the two mold half-shells, one of the two mold half-shells, preferably both mold half-shells, being serviceable from said inner walkway. At least one operator opening and an escape path which runs along below one of the two mold half-shells and which is passable from the at least one operator opening are preferably provided in the one inner walkway.

The invention utilizes the concept of making available an additional escape path which is passable by way of an operator opening in the inner walkway, or is directly accessible from the latter. The inner walkway herein is understood to be in particular a passable way which is composed of scaffolding boards, steel grates, or similar, and is disposed along an upper side of a walkway frame. An opening in the inner walkway which has an opening width such that an operator can comfortably climb through this operator opening, thus an opening width of approximately 50 to 100 centimeters, is provided in that portion of the walkway that in the longitudinal direction is disposed so as to be approximately central; the operator opening can be configured so as to be rectangular, square, or circular, even elliptic, or in some other manner. The operator opening during the manufacturing method of the rotor blade or of the two rotor blade half-shells, respectively, is closed by a hatch, the hatch potentially being pivotable about an articulation, but in a preferred embodiment said hatch can also be disposed in the walkway so as to be displaceable and be operated electrically by way of an emergency switch that is disposed laterally on the handrail of the walkway, or manually by way of a mechanism.

The escape path preferably connects the operator openings, for example by way of a ladder, a stairway, or similar, and a passageway, to an outer longitudinal side of one of the two mounting apparatuses. Said escape path thus preferably runs toward the aerodynamic trailing edge of the rotor blade. On account thereof, the escape path from the operator opening into the assembly shed is particularly short since only the short width of one mold half-shell has to be passed under.

Particularly preferably, one mold half-shell during folding remains so as to be positionally fixed on the ground, and one foldable mold half-shell is foldable from the opened position to the closed position, wherein the escape path is routed within the substructure of the foldable mold half-shell.

That mold half-shell that represents the aerodynamic suction side of the rotor blade is particularly preferably disposed in a positionally fixed manner, since the substructure in the case of this mold half-shell has a significantly lower installation height and thus lower rigidity than that mold half-shell that represents the aerodynamic pressure side of the rotor blade and which in particular in the case of geometrically pre-bent rotor blades is distinguished by a very large installation height and thus high rigidity.

Modern rotor blades can have lengths from 40 to 75 meters; even longer rotor blades are expected to be made in the future. The rotor blades have a tip-side end and a stem-side end, wherein the rotor blades, proceeding from the stem-side end, are preferably geometrically pre-bent in the direction of the aerodynamic pressure side, in a manner substantially perpendicular to the axis line of the profile. The rotor blades are assembled from a suction-side and from a pressure-side rotor blade half-shell. When the rotor blade half-shells are placed beside one another, the open side thereof facing upward, the pressure-side rotor blade half-shell when viewed in the longitudinal direction is bent upward in the central portion and the pressure-side rotor blade half-shell is bent downward. The suction-side rotor blade half-shell has a significantly smaller vertical spacing from the ground than the pressure-side half-shell. It is therefore purposeful for the escape path to be routed below that mold half-shell that in the central region is bent further upward. This usually corresponds to the pressure-side rotor blade half-shell since the latter in the cut-open state is significantly more flexurally rigid than the suction-side rotor blade half-shell, and is thus lighter and can endure the forces that arise in folding the mold half-shells at a lower specific deformation.

The mounting installations are expediently configured as a framework, favorably as a steel framework, most favorably as a tubular steel framework. The steel tubes can be fixedly connected to one another by clamps, or are screwed or welded to one another.

However, it is also conceivable for the mounting installations to be formed by a timber or plastics framework construction. It is also provided that the mounting installations are configured from fully planar walls which can be reinforced by a framework structure.

In one preferred embodiment of the invention, the production mold can have two or more inner walkways. In particular when the two inner longitudinal sides of the mold half-shells have a large mutual spacing which is larger than one meter, preferably larger than 1.5 meters or 2 meters, one inner walkway can be disposed along each of the two mold half-shells. The at least two walkways in this instance can be connected to one another at least in sections by way of additional walkways.

Each of the inner walkways has a width of approximately 50 to 150 centimeters. The two inner walkways can be connected to one another by way of short transverse paths.

However, it is also conceivable for the walkways not to be connected to one another by way of transverse paths.

However, in particular in this instance it is preferably provided that each inner walkway has one operator opening. A person can climb down from each individual operator opening by means of in each case one stairway or ladder or sliding pole, and make their way into the escape path. The escape path of the one operator opening, and the escape path of the other operator opening can converge.

Side walls and ceiling and floors of the escape path are particularly preferably equipped with a fireproof or fire-retardant cladding, or are produced directly from a fireproof or fire-retardant material such that a safe escape of the operator is possible even when the production mold or the immediate vicinity of the escape path has already caught fire.

BRIEF DESCRIPTION OF THE DRAWINGS

The invention will be described by means of one exemplary embodiment in three figures in which:

FIG. 2 shows a lateral view of a mold half-shell of the production mold, with the walkways in a lateral view;

FIG. 3 shows a plan view of the production mold, with the four walkways in a plan view.

Figure 1:
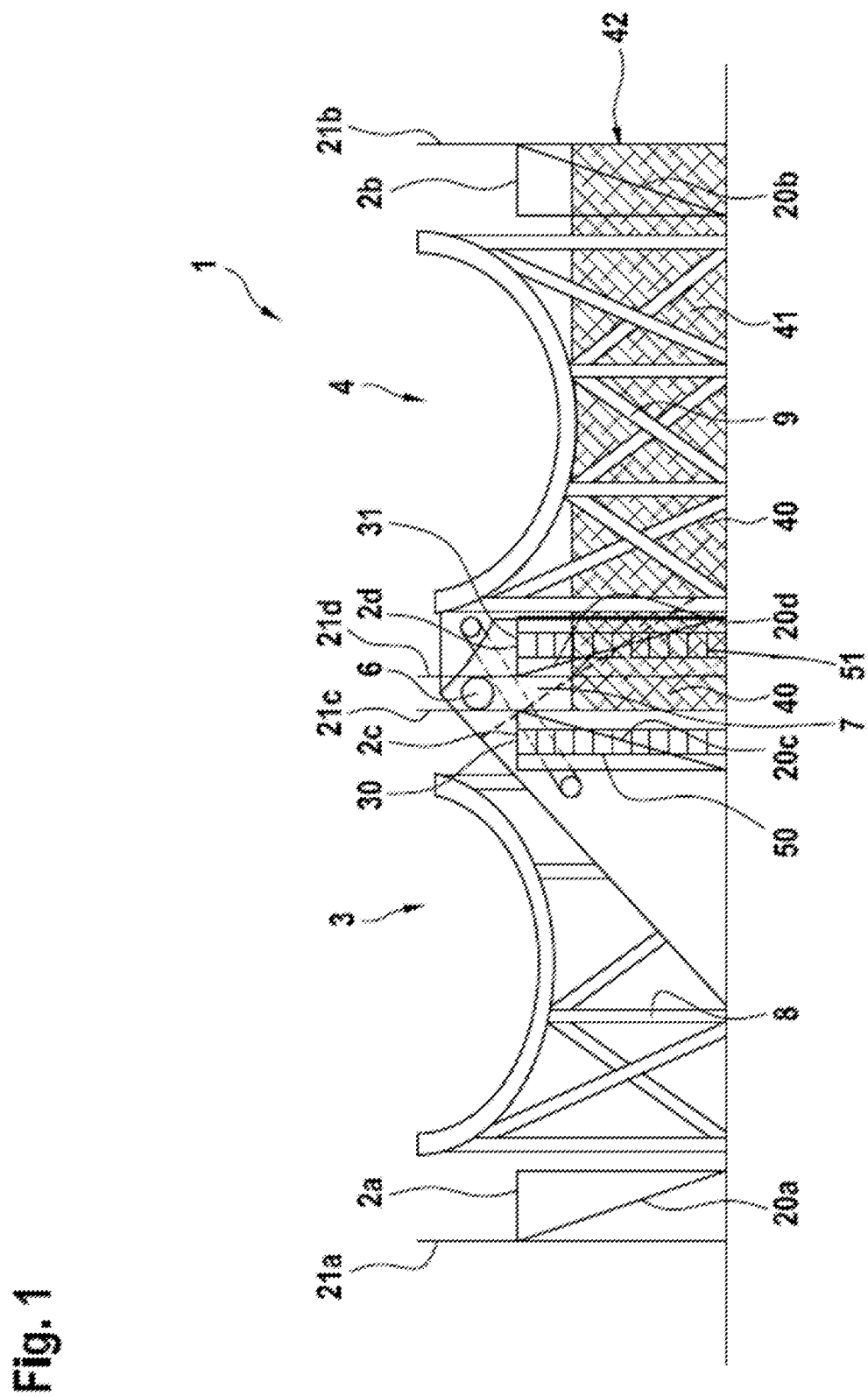
FIG. 1 shows a view onto the stem or tip side of a production mold according to the invention, having four walkways.

The embodiments of the figures differ somewhat from one another. The figures are not to scale.

DETAILED DESCRIPTION OF THE SEVERAL EMBODIMENTS

FIG. 1 shows a production mold 1. The production mold 1 comprises two mold half-shells 3, 4, of which one suction-side mold half-shell 3 in FIG. 1 is disposed on the left and is positioned so as to be positionally fixed on a ground of an assembly shed, while another pressure-side mold half-shell 4 in FIG. 1 is disposed on the right beside the suction-side mold half-shell 3 and by way of articulations 6 and a hydraulic folding mechanism 7 can be converted from the opened position illustrated in FIG. 1 to a closed position in that the suction-side mold half-shell 4 is pivoted in a counter-clockwise manner about the articulations 6. The pressure-side mold half-shell 4 is foldable, the suction-side mold half-shell 3 being positionally fixed during the folding procedure.

The terms suction side and pressure side herein relate to a rotor blade which in a conventional manner has an aerodynamic suction side and an aerodynamic pressure side. The references are applied in a corresponding manner also to the respective mold half-shells 3, 4.

Walkways for operators, two lateral outer walkways 2a, 2b, and two inner walkways 2c, 2d, are disposed along peripheries of the two mold half-shells 3, 4. The lateral outer walkways 2a, 2b run along the longitudinal sides of the mold half-shells 3, 4 that in the opened state of the production mold are spaced apart the widest, while the inner walkways 2c, 2d run between the two unfolded mold half-shells 3, 4, in each case along a periphery of one of the two mold half-shells 3, 4.

Both the one as well as the other mold half-shell 3, 4 are in each case an integral laminated component in which in each case one rotor blade half-shell can be manufactured by a laminating method. The term integral herein is also intended to comprise the combination in which the mold half-shells 3, 4 in a first step are constructed in segments, and said segments in a second step are connected to one another in a suitable manner so as to form the one mold half-shell 3, 4.

The mold half-shells 3, 4 can be composed of plastics, or else in principle of other materials such as timber, aluminum, or steel.

Once the two rotor blade half-shells (not illustrated) have been manufactured in the two mold half-shells 3, 4, an adhesive agent layer is applied to rotor blade half-shell peripheries that encircle the respective rotor blade half-shell up to the rotor blade stem. The adhesive agent layer is preferably applied to the rotor blade half-shell periphery of the rotor blade half-shell of the positionally fixed mold half-shell 3.

The foldable mold half-shell 4 is then folded in the clockwise direction onto the positionally fixed mold half-shell 3 in FIG. 1, such that the two mold half-shells 3, 4 are positioned directly on top of one another. On account thereof, the two peripheries of the rotor blade half-shells are likewise folded on top of one another until there is contact between the adhesive agent layer and the two rotor blade half-shell peripheries. The foldable mold half-shell 4 is then pushed onto the positionally fixed mold half-shell 3 until a predetermined gap width is established between the two peripheries of the rotor blade half-shell. The gap is favorably completely filled by the adhesive agent.

In the opened state of the production mold 1 according to FIG. 1, the two mold half-shells 3, 4 are positioned transversely to a longitudinal direction L, so as to be mutually parallel, preferably so as to be parallel beside one another; each of the two mold half-shells 3, 4 in this exemplary embodiment is disposed on a steel framework 8, 9, wherein the positionally fixed mold half-shell 3 is fixedly connected on a positionally fixed steel framework 8, and the foldable mold half-shell 4 is fixedly connected on a steel framework 9 which, while being folded to the closed position conjointly with the foldable mold half-shell 4, is likewise foldable. The mold half-shells 3, 4 are connected to respective steel framework 8, 9 thereof in a manner that is relatively positionally fixed and permanent.

The mold half-shells 3, 4 in each case have one inner longitudinal side and one outer longitudinal side that are directly opposite one another. The two inner longitudinal sides and the two outer longitudinal sides, after being folded to the closed position of the production mold 1, are directly on top of one another. The two inner longitudinal sides of the two rotor blade half-shells, after the production molds 1 have been folded together, form the aerodynamic nose, or the leading edge, respectively, of the rotor blade, and the two outer longitudinal sides of the rotor blade half-shells, after the production mold 1 has been folded together, form the aerodynamic trailing edge of the rotor blade.

In the embodiment in FIG. 1, in each case one inner walkway frame 20c, 20d, in each case one of the two inner walkways 2c, 2d being provided on the upper end of the former that faces away from the ground, is disposed along the two inner longitudinal sides. The two inner walkways are specified for servicing the positionally fixed, or the foldable mold half-shell 3, 4, respectively.

The two outer walkways 2a, 2b are disposed on two outer walkway frames 20a, 20b on that side that faces away from the ground; the walkways 2a, 2b, 2c, 2d are produced from steel grates and/or scaffolding boards. The walkways 2a, 2b, 2c, 2d each run directly along the periphery of the mold half-shells 3, 4 or at a suitable spacing therefrom, in order for comfortable servicing of the inner side of the mold half-shells 3, 4 to be possible by operators who are standing on the walkways 2a, 2b, 2c, 2d.

The height above the ground of the walkways 2a, 2b, 2c, 2d along the longitudinal extent of each individual walkway 2a, 2b, 2c, 2d is potentially variable since the walkways are adapted to the vertical profile of the outer edges of the mold half-shells 3, 4. Furthermore, the heights of the walkways 2a, 2b, 2c, 2d, measured perpendicularly to the longitudinal direction L, can also be mutually dissimilar since the peripheries of each of the mold half-shells 3, 4 along a section perpendicular to the longitudinal direction L have a dissimilar height above the ground.

It is therefore possible that two mutually independent and mutually spaced apart inner walkways 2c, 2d are provided, as is illustrated in FIG. 1, which in each case run along an inner periphery of the positionally fixed, or the foldable mold half-shell 3, 4, respectively, wherein it is also conceivable, however, that in other embodiments only one single walkway which is sufficiently wide such that the inner sides of the two mold half-shells 3, 4 can be serviced from the one inner walkway is disposed between the two mold half-shells 3, 4.

The walkways 2a, 2b, 2c, 2d are preferably disposed such that the former commence at the periphery of the mold half-shells 3, 4 and comprise the tip-side and/or stem-side ends of the mold half-shells.

The walkways 2a, 2b, 2c, 2d are assembled on the walkway frames 20a, 20b, 20c, 20d, wherein the walkway frames 20a, 20b, 20c, 20d can be conventional builders' or painters' scaffolding.

The length of the mold half-shells 3, 4 is determined by the length of the rotor blade which is manufactured with the aid of the two mold half-shells 3, 4. Rotor blades of modern wind turbine plants can readily have lengths between 40 and 65 meters, in some instances even of more than 75 meters.

Emergencies can arise in particular during the duration of the production method of the two rotor blade half-shells, for example when a fire starts or a fire alarm is set off, and the operators are on the inner walkways 2c, 2d. The distance to the tip-side or stem-side end of the walkway 2c, 2d, respectively, at which a descent to the ground or the shed floor, respectively, is located, is up to 40 meters and is thus very long.

Furthermore, in particular during the manufacturing method of the rotor blade half-shells, an escape from the inner walkways 2c, 2d by way of the production mold 1 is also dangerous and in most cases impossible because the rotor blade half-shells or mold half-shells 3, 4, respectively, at least in regions are geometrically shaped such that crossing is difficult if not impossible, on the one hand, and as a consequence of the manufacturing process the surface of the rotor blade half-shells or mold half-shells 3, 4 at least at times has such a high surface temperature that crossing is likewise impossible, on the other hand.

The invention therefore, in a manner approximately central along the inner walkways 2c, 2d, provides operator openings 30, 31 in at least one of the inner walkways 2c, 2d, preferably in both inner walkways 2c, 2d, said operator openings 30, 31 in each case being sufficiently large such that an operator can climb therethrough. The operator openings 30, 31 therefore preferably have an opening width of approximately 50 centimeters, preferably 60 centimeters, or even more centimeters. The operator openings 30, 31 can be configured so as to be rectangular, square, or optionally also circular. The statement of the opening width refers to the shortest spacing of two mutually opposite peripheral points of the operator openings 30, 31.

Since the walkways 2a, 2b, 2c, 2d are composed of scaffolding plates, steel sheets, or similar, for example, they likewise favorably have a width of approximately 50 to 150 centimeters, such that the operator opening 30, 31 occupies approximately the entire width of an inner walkway 2c, 2d. It is therefore preferably provided that the operator openings 30, 31 during the production method of the rotor blade half-shells are closed by a hatch. This herein can be a pivotable hatch but preferably a sliding hatch which is displaceable in a reciprocating manner along the horizontal. The hatch can be walked on in the closed state and can be stressed with the same load as the remaining regions of the walkways, therefore withstanding in particular the weight of at least one operator, and closes the associated inner walkway 2c, 2d.

The walkways 2a, 2b, 2c, 2d on that side that faces away from the mold are typically provided with a handrail 21a, 21b, 21c, 21d; however, the handrails 21c and 21d can be omitted in those regions in which the walkways are connected to one another; an emergency switch 32 which upon activation immediately releases the operator opening 30, 31 and laterally displaces the hatch electrically, electromechanically, hydraulically, pneumatically, or by way of another operative principle can be provided on one or both inner handrails 21c, 21d in the region of the operator opening 30, 31. However, a purely mechanical device which releases the operator opening 30, 31 can also be present. A stairway or ladder 50, 51, or a sliding pole, by way of which the operator can exit the inner walkway 2c, 2d through the opened operator opening 30, 31 in an emergency is provided below the operator opening 30, 31. An escape path 40 by way of which the operator can escape from the ground-side end of the stairway or ladder 50, 51, or sliding pole, under the production mold 1 into the assembly shed and from there to the assembly point provided is provided below at least one of the two mold half-shells 3, 4. The at least one escape path 40 has an exit 42 to the assembly shed.

As is shown in FIG. 2, the escape path 40 on the side walls thereof and on the ceiling, and optionally also on the floor thereof, is cladded with a fireproof or fire-retardant cladding 41, or the walls, the ceiling, and the floor are composed of fireproof or fire-retardant materials. The escape path 40 preferably connects the operator openings 30, 31 to the outer longitudinal side of the foldable steel framework 9, this also including the possibility that the escape path 40 also traverses the walkway frame 2a, 2b.

The escape path 40 is preferably routed along below the foldable mold half-shell 4; the foldable mold half-shell 4, when viewed along the longitudinal direction L, in the opened state centrally has a significantly larger height above the ground than the positionally fixed mold half-shell 3. The aerodynamic pressure side of the rotor blade is preferably produced with the aid of the foldable mold half-shell 4.

It has been demonstrated that the pressure-side rotor blade half-shell can be folded in a significantly easier manner than the suction-side rotor blade half-shell, since the former has a higher resistance to bulging and bending, when these are rotor blade half-shells for a pre-bent rotor blade.

The escape path 40 which expediently has the fireproof or fire-retardant cladding 41, or is composed of a fireproof or fire-retardant material, is typically connected together with the cladding 41 in a permanent manner to the foldable substructure 9 and is thus likewise folded when the production mold 1 is folded together. However, it is also possible for the escape path 40 together with the cladding 41 to not be fixedly connected to the foldable substructure 9, said escape path 40 in this instance remaining positioned on the floor of the assembly shed also when the mold half-shell 4 is folded shut.

The view of the opened production mold 1 is shown in a plan view in FIG. 3. The two operator openings 30, 31 together with the escape path 40 that is indicated by dashed lines are provided so as to be approximately central in the longitudinal direction L along the inner walkway 2c, 2d along the foldable mold half-shell 4. The one operator opening 30 is provided along the one inner walkway 2c, so as to be approximately central along the positionally fixed mold half-shell 3, and the other operator opening 31 is provided along the other inner walkway 2d, so as to be approximately central along the foldable mold half-shell 4. In each case one stairway or ladder 50, 51, or sliding pole, is provided below the two operator openings 30, 31. From the exit 42 of the escape path 40 up to the other operator opening 31 that is illustrated in FIG. 3, the escape path 40 for both operator openings 30, 31 is identical; part of the escape path 40 between the one operator opening 30 and the other operator opening 31 is specified for only the one operator opening 30.

LIST OF REFERENCE SIGNS

1 Production mold
2a Outer walkway
2b Outer walkway
2c Inner walkway
2d Inner walkway
3 Mold half-shell, positionally fixed
4 Mold half-shell, foldable
6 Articulations
7 Folding mechanism
8 Steel framework, positionally fixed
9 Steel framework, foldable
20a Outer walkway frame
20b Outer walkway frame
20c Inner walkway frame
20d Inner walkway frame
21a Outer handrail
21b Outer handrail
21c Inner handrail
21d Inner handrail
30 Operator opening
31 Operator opening
32 Emergency switch
40 Escape path
41 Cladding
42 Exit
50 Ladder
51 Ladder
L Longitudinal direction

What is claimed is:

1. Production mold for a rotor blade of a wind turbine plant, having two mold half-shells (3, 4) which are disposed beside one another, and having at least one inner walkway (2c, 2d) that runs along so as to be between the two mold half-shells (3, 4),
   characterized by at least one escape path (40) which runs along below at least one of the two mold half-shells (3, 4); and
   characterized in that the at least one inner walkway (2c, 2d) which has at least one operator opening (30, 31) through which the escape path (40) is reachable from the inner walkway (2c, 2d) is disposed between the two mold half-shells and in that the at least one inner walkway (2c, 2d) is disposed along each of the mutually facing longitudinal sides of the mold half-shells (3, 4), and each of the two inner walkways (2c, 2d) has in each case one operator opening (30, 31).

2. Production mold according to claim 1, characterized in that the mold half-shells (3, 4) have in each case one open side and are in each case disposed on a mounting installation (8, 9), and the two mounting installations (8, 9) are interconnected in an articulated manner and are foldable in a reciprocating manner from an opened position in which the two mold half-shells (3, 4), the open sides thereof facing upward, are disposed beside one another, to a closed position in which the two mold half-shells (3, 4), the open sides thereof facing one another, are disposed on top of one another, and the inner walkway (2c, 2d) in the opened position runs along between the two mold half-shells (3, 4).

3. Production mold according to claim 1, characterized in that the escape path (40) connects an at least one operator opening (30, 31) to an outer longitudinal side of one of the two mounting installations (8, 9).

4. Production mold (1) according to claim 1, characterized in that a positionally fixed mold half-shell (3) during folding remains so as to be positionally fixed on the ground, and a foldable mold half-shell (4) is foldable from the opened position to the closed position, while the escape path (40) is routed below the foldable mold half-shell (4).

5. Production mold (1) according to claim 1, characterized in that a positionally fixed mold half-shell (3) is disposed on a positionally fixed mounting installation, and a foldable mold half-shell (4) is disposed on a foldable mounting installation, and the positionally fixed mounting installation and/or the foldable mounting installation are/is in each case configured as a steel framework (8, 9).

6. Production mold (1) according to claim 1, characterized in that an at least one operator opening (30, 31) cover is lockable, and the cover has a closed position in which said cover is passable, and has an opened position in which the escape path (40) is accessible by way of a ladder (50, 51) or a stairway or a sliding pole, for example.

7. Production mold (1) according to claim 1, characterized in that the cover of an at least one operator opening (30, 31) is a sliding hatch.

8. Production mold (1) according to claim 1, characterized in that the cover of an at least one operator opening (30, 31) is operable by way of an emergency switch (32) which is disposed at gripping height beside the at least one operator opening (30, 31).

9. Production mold (1) according to claim 1, characterized in that the cover of an at least one operator opening (30, 31) is operable by way of a mechanism, for example a crank or a pump lever, which is disposed at gripping level beside the at least one operator opening (30, 31).

10. Production mold (1) according to claim 1, characterized in that each of the two operator openings (30, 31) is connected in a passable manner to the same escape path (40).

11. Production mold (1) according to claim 1, characterized in that side walls and/or floors and/or ceilings of the escape path (40) are composed of a fireproof or fire-retardant material.

12. Production mold (1) according to claim 1, characterized in that side walls and/or floors and/or ceilings of the escape path (40) are cladded with a fireproof or fire-retardant cladding (41).

13. Production mold (1) according to claim 1, characterized in that outer walkway frames 20a and/or 20b are disposed along outer longitudinal sides of the mold half-shells (3, 4), and the escape path (40) is continued also through the walkway frames (20a, 20b).

14. Production mold (1) according to claim 1, characterized in that the outer walkways (2a, 2b) and the at least one inner walkways (2c, 2d) are configured as abutting tiles which are fitted onto walkway frames (20a, 20b, 20c, 20d).

* * * * *